United States Patent
Brovko

(10) Patent No.: US 11,378,677 B2
(45) Date of Patent: Jul. 5, 2022

(54) SPATIAL IMAGING APPARATUS AND METHOD FOR IMAGING RADAR

(71) Applicant: Electromagnetic Systems, Inc., El Segundo, CA (US)

(72) Inventor: Oleg Brovko, Los Angeles, CA (US)

(73) Assignee: Electromagnetic Systems, Inc., El Segundo, CA (US)

( * ) Notice: Subject to any disclaimer, the term of this patent is extended or adjusted under 35 U.S.C. 154(b) by 581 days.

(21) Appl. No.: 16/417,258

(22) Filed: May 20, 2019

(65) Prior Publication Data
US 2022/0163659 A1    May 26, 2022

Related U.S. Application Data

(60) Provisional application No. 62/674,007, filed on May 20, 2018.

(51) Int. Cl.
| | |
|---|---|
| *G01S 13/89* | (2006.01) |
| *G01S 7/28* | (2006.01) |
| *G01S 13/42* | (2006.01) |
| *G01S 13/02* | (2006.01) |

(52) U.S. Cl.
CPC ............ *G01S 13/89* (2013.01); *G01S 7/2813* (2013.01); *G01S 13/42* (2013.01); *G01S 2013/0245* (2013.01)

(58) Field of Classification Search
CPC ........ G01S 13/89; G01S 7/2813; G01S 13/42; G01S 2013/0245; G01S 13/87; G01S 13/723; G01S 13/34; G06T 5/50
See application file for complete search history.

(56) References Cited

U.S. PATENT DOCUMENTS

| | | | |
|---|---|---|---|
| 7,180,443 B1* | 2/2007 | Mookerjee | ............ G01S 13/723 342/162 |
| 9,207,314 B1* | 12/2015 | Mookerjee | ............ G01S 13/723 |
| 2011/0140949 A1* | 6/2011 | Lee | .......... G01S 13/34 342/107 |

(Continued)

OTHER PUBLICATIONS

A. Hochman et a., "Reduced-Order Models for Electromagnetic Scattering Problems"; IEEE Transactions on Antennas and Propagation; vol. 62, No. 6; Jun. 2014; pp. 3150-3162; published by IEEE, Piscataway, NJ, USA. (Year: 2014).*

*Primary Examiner* — Bernarr E Gregory
(74) *Attorney, Agent, or Firm* — Alonzo + Associates; Arlyn Alonzo

(57) ABSTRACT

Aspects of the disclosure are directed to spatial imaging using an imaging radar including generating a plurality of range/Doppler/channel images from a detected image and a four-dimensional image; generating a transfer matrix for each of the plurality of range/Doppler/channel images; generating a plurality of scatterer parameters using maximum likelihood (ML) processing on the plurality of range/Doppler/channel images; generating a plurality of refined scatterer parameters from the plurality of scatterer parameters and the transfer matrix; determining a minimal-order scatterer configuration using the plurality of refined scatterer parameters and the transfer matrix; and generating a set of determined scatterer parameters from the minimal-order scatterer configuration and the transfer matrix.

18 Claims, 3 Drawing Sheets

(56) References Cited

U.S. PATENT DOCUMENTS

| | | | | |
|---|---|---|---|---|
| 2011/0237939 A1* | 9/2011 | Melamed | ................ | G06T 5/50 |
| | | | | 600/425 |
| 2012/0274499 A1* | 11/2012 | Chang | .................... | G01S 13/89 |
| | | | | 342/107 |
| 2016/0116582 A1* | 4/2016 | Chang | .................... | G01S 13/89 |
| | | | | 342/25 A |
| 2018/0024235 A1* | 1/2018 | Hong | .................... | G01S 13/87 |
| | | | | 342/59 |

* cited by examiner

SPATIAL IMAGING APPARATUS AND METHOD FOR IMAGING RADAR

CLAIM OF PRIORITY UNDER 35 U.S.C. § 119

The present Application for Patent claims priority to Provisional Application No. 62/674,007 entitled "SPATIAL IMAGING APPARATUS AND METHOD FOR IMAGING RADAR" filed May 20, 2018, and assigned to the assignee hereof and hereby expressly incorporated by reference herein.

TECHNICAL FIELD

This disclosure relates generally to the field of imaging, and, in particular, to spatial imaging using an imaging radar.

BACKGROUND

A radar, for example, an imaging radar, may create a two-dimensional image of a scene. One example of an imaging radar is a synthetic aperture radar (SAR). A SAR may create a high-resolution image from reflected signals via range-Doppler processing. However, a SAR may not form a high-resolution image in a forward direction of a moving platform due to geometrical constraints on range-Doppler processing. An alternative radar imaging technique is needed to produce a high-resolution image in the forward direction of a moving platform.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides spatial imaging. Accordingly, a method for spatial imaging using an imaging radar includes generating a plurality of range/Doppler/channel images from a detected image and a four-dimensional image; generating a transfer matrix for each of the plurality of range/Doppler/channel images; generating a plurality of scatterer parameters using maximum likelihood (ML) processing on the plurality of range/Doppler/channel images; generating a plurality of refined scatterer parameters from the plurality of scatterer parameters and the transfer matrix; determining a minimal-order scatterer configuration using the plurality of refined scatterer parameters and the transfer matrix; and generating a set of determined scatterer parameters from the minimal-order scatterer configuration and the transfer matrix.

In one example, the maximum likelihood (ML) processing uses the transfer matrix and a lattice of azimuth/elevation lattice locations. In one example, the method further includes generating the four-dimensional image from a virtual receive channel digitized data obtained from a received reflected waveform. In one example, the method further includes receiving the received reflected waveform from a plurality of receive antenna elements. In one example, the method further includes generating the detected image with a plurality of detected elements detected using the four-dimensional image.

In one example, the virtual receive channel digitized data are obtained from a plurality of real receive channels. In one example, the virtual receive channel digitized data are obtained from a plurality of virtual receive channels. In one example, the detected image is generated using thresholding, Constant False Alarm Rate (CFAR) detection or a machine learned detection algorithm.

In one example, the method further includes generating the plurality of range/Doppler/channel images by mitigating interference between scatterers that are in a same range/Doppler bin but are separated by more than the intrinsic radar resolution in azimuth or elevation. In one example, the transfer matrix maps the range/Doppler/channel image into an azimuth/elevation domain. In one example, the scatterer parameters include a quantity of scatterers, a plurality of scatterer azimuth/elevation lattice locations, or a plurality of scatterer amplitudes and phases.

In one example, the method further includes generating the refined scatterer parameters by moving each of the plurality of scatterer azimuth/elevation lattice locations within an initial scatterer configuration to a plurality of neighboring lattice locations to generate a perturbed scatterer configuration. In one example, the perturbed scatterer configuration is generated while holding other scatterer lattice locations fixed. In one example, the generation of the set of determined scatterer parameters includes generating an output lattice configuration.

In one example, the set of determined scatterer parameters may include a determined quantity of scatterers, a plurality of determined scatterer azimuth/elevation lattice locations, or a plurality of determined scatterer amplitudes and phases for the output lattice configuration. In one example, the minimal-order scatterer configuration may be determined by generating a plurality of sensitivity values for scatterers in an intermediate scatterer configuration. In one example, the plurality of sensitivity values is generated by separately removing the presence of each scatterer in a specific lattice location for the intermediate scatterer configuration through the transfer matrix. In one example, the plurality of sensitivity values is generated by separately setting the amplitude to zero of each scatterer in a specific lattice location for the intermediate scatterer configuration.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
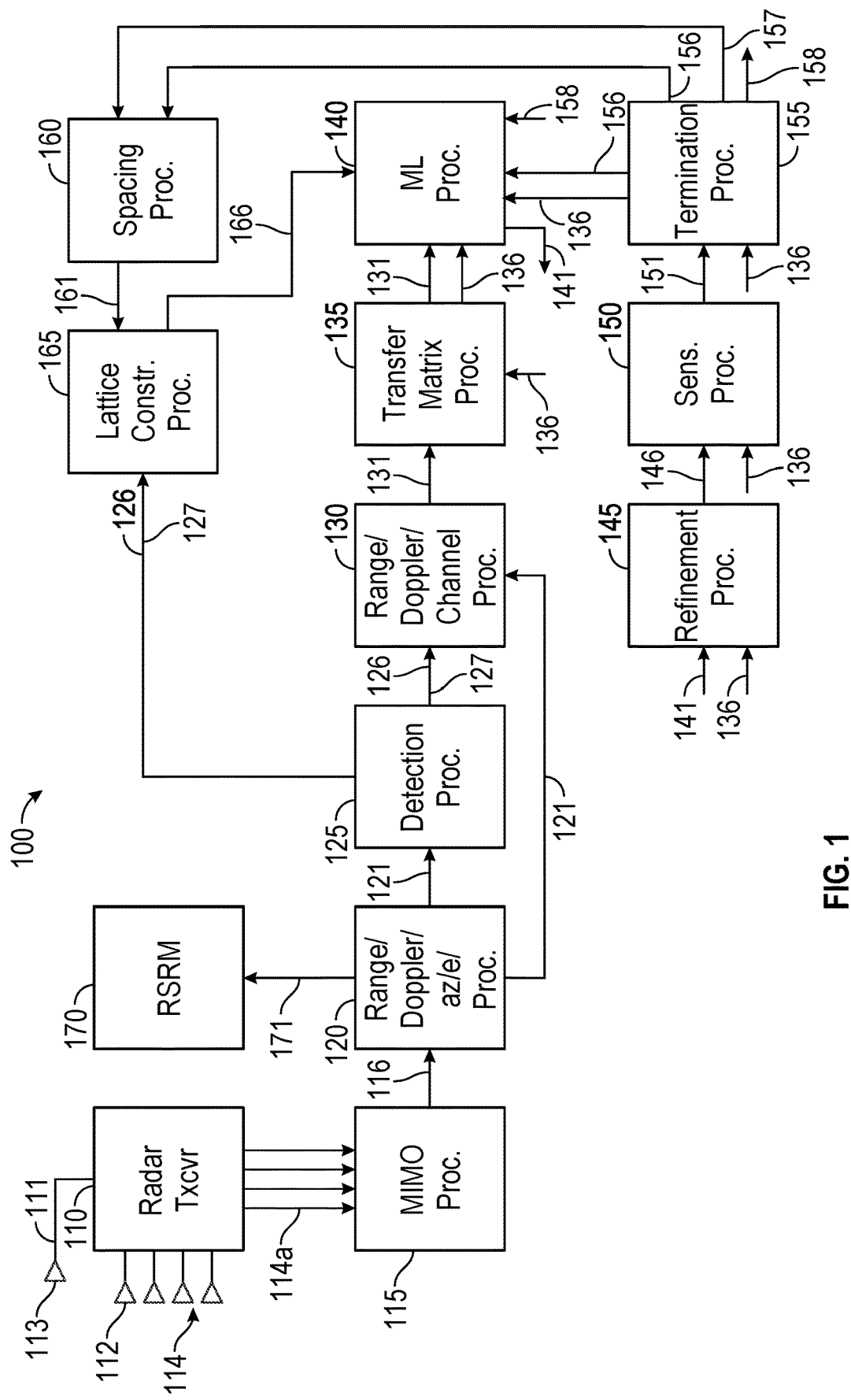
FIG. 1 illustrates a first example block diagram of a radar system in accordance with the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one example, radar imaging techniques such as Synthetic Aperture Radar (SAR) may not form high-resolution images in a forward direction of a moving platform, i.e. forward imaging. For example, the forward direction of the moving platform is coincident with the direction of a velocity vector of the moving platform. In one aspect, the present disclosure provides an algorithmic process to address forward imaging of stationary and moving scatterers using spatial degrees of freedom (DOF) with improved resolution over an intrinsic angular resolution of the radar system.

In one example, for multiple-input multiple-output (MIMO) radar, the spatial DOF are transmit/receive pairs of channels. In another example, for phased array radar, the DOF are a plurality of spatial receive channels. In one example, an intrinsic azimuth resolution of the radar system is a ratio of radar wavelength to an azimuth extent of the radar antenna and an intrinsic elevation resolution of the radar system is a ratio of the radar wavelength to an elevation extent of the radar antenna.

In one example, the present disclosure utilizes a Maximum Likelihood (ML) criterion to estimate scatterer parameters and incorporates multiple hypothesis tests to simultaneously determine the quantity of scatterers present. In one example, to be useful in a real-time processing environment, computational throughput is minimized by defining a lattice in azimuth and elevation and by pre-calculating matrix operators for each lattice point in the lattice.

In one example, the present disclosure provides an apparatus and method to detect and localize radar returns from stationary and moving scatterers illuminated by a radar, through digital signal processing. For example, radar returns are measurements made by a radar receiver from a radar waveform generated by a radar transmitter and reflected by stationary and moving scatterers. In one aspect, the present disclosure is applicable to radars with multiple channels, e.g., electronically scanned array radars, phased array radars Multiple Input Multiple Output (MIMO) radars, and other variants of radars possessing multiple channels for spatial diversity. In one example, the present disclosure is designed to work even when multiple scatterers are located in a same range/Doppler bin. One skilled in the art would understand that although forward looking radar applications are mentioned herein, other types of applications for processing radar returns from both stationary and moving scatterers may be within the spirit and scope of the present disclosure.

FIG. 1 illustrates a first example block diagram of a radar and processor in accordance with the present disclosure. In FIG. 1, the flow of data and signal processing through the radar is shown via the arrows. In one example, a real receive channel is a signal path in the radar receiver associated with one receive antenna element. In one example, a virtual receive channel is a signal with multiple receive antenna elements and multiple transmit elements.

FIG. 1 illustrates a first example block diagram of a radar system 100 in accordance with the present disclosure. In FIG. 1, the flow of data and signal processing through the radar system 100 is shown via the arrows. For example, one or more transmit antenna elements 111 radiate a transmit waveform 113 towards a plurality of scatterers. In one example, multiple receive antenna elements 112 capture a reflected waveform 114 from the plurality of scatterers. In one example, a radar transceiver 110 is coupled to transmit antenna elements 111 and receive antenna elements 112. Although one transmit antenna element and four receive antenna elements are shown, one skilled in the art would understand that the quantity of transmit or receive antenna elements shown is not limiting and that other quantities may be used within the scope and spirit of the present disclosure.

For example, the radar transceiver 110 generates the transmit waveform 113 radiated by the transmit antenna elements 111 and receives the reflected waveform 114 captured by the receive antenna elements 112. The radar transceiver 100 may convert the received reflected waveform 114 into a digitized receive data flow 114a for a plurality of receive channels 114b (not shown). For example, each receive channel 114b may be mapped to one of the multiple receive antenna elements 112. In one example, the radar transceiver 100 may include digital to analog converters (DACs), upconverters, filters, amplifiers, passive components, low noise amplifiers, downconverters, analog to digital converters (ADCs), frequency synthesizers, oscillators, etc.

In one example, the digitized receive data flow 114a may be sent to a MIMO processor 115 (e.g., a processor coupled to a memory unit) for producing virtual receive channel digitized data 116. In the case of a multiple input multiple output (MIMO) radar, MIMO processor 115 may include MIMO processing required to produce virtual receive channel digitized data 116. For example, consider a MIMO radar with three transmit channels and four receive channels. MIMO processing contained in MIMO processor 115 may produce (i.e., represent) up to twelve virtual receive channels, for example. Accordingly, in one example, the output may produce (i.e., represent) up to twelve virtual channels rather than four real receive channels. In other examples, the number of virtual channels may be chosen based on the number of transmit channels and the number of receive channels.

In one example, the virtual receive channel digitized data 116 are processed in a range/Doppler/azimuth/elevation processor 120 to form a four-dimensional image 121 at its output. In one example, the four-dimensional image 121 is a range/Doppler/azimuth/elevation image. In one example, the range/Doppler/azimuth/elevation processor 120 is coupled to a memory unit for a range/Doppler/azimuth/elevation data transformation. In one example, the range/Doppler/azimuth/elevation processor 120 uses coherent processing time intervals of fixed duration. The coherent processing time interval may be pre-specified for each radar mode, in accordance with a required update rate for that mode.

In one example, a radar sensor resource manager (RSRM) 170 may inform the range/Doppler/azimuth/elevation processor 120 of the radar mode in use. For example, the output of the RSRM 170 may be a mode signal 171 which specifies the radar mode. In one example, the four-dimensional image 121 may be formed via a four-dimensional Fourier transform. In another example, the formation of the four-dimensional image 121 may be implemented via two processing steps: range/Doppler imaging and azimuth/elevation imaging. In one example, range/Doppler imaging may be performed using keystone processing and azimuth/elevation imaging may be performed using a two-dimensional Fourier transform. In one example, keystone processing is a form of digital signal processing used to compensate for range migration (e.g., motion of a particular radar scatterer over more than one range resolution cell during a coherent processing time interval).

In one example, the four-dimensional image 121 is processed in a detection processor 125 to form a detected image 126 at its output. In one example, the detection processor 125 is coupled to a memory unit for thresholding, Constant False Alarm Rate (CFAR) detection, or similar detection operation. For example, the detected image 126 includes a plurality of detected elements 127.

For example, the detection processor 125 may mitigate the impact of receiver noise on the radar. In one example, the detection processor 125 may include thresholding, Constant False Alarm Rate (CFAR) detection, or a machine learned detection algorithm. In one example, the machine learned detection algorithm may be a deep convolutional neural network.

In one example, the detected image 126 with a plurality of detected elements 127 may be processed in a range/Doppler/channel processor 130 to form a plurality of range/Doppler/channel images 131. In one example, the range/Doppler/channel processor is coupled to a memory unit for a range/Doppler/channel data transformation. In one example, the range/Doppler/channel processor 130 mitigates interference between scatterers that are in the same range/Doppler bin but are separated by more than the intrinsic radar resolution in azimuth or elevation. For example, the range/Doppler/channel processor 130 may suppress interfering detections and then generate the range/Doppler/channel images 131 from the detected image 126. In one example, the interference suppression may set main lobes of interfering scatterers to zero. In one example, the range/Doppler/channel images 131 may be generated by an inverse two-dimensional Fourier transform.

In one example, a transfer matrix processor 135 produces a transfer matrix 136 for each range/Doppler/channel image 131. In one example, the transfer matrix processor 135 is coupled to a memory unit. For example, the transfer matrix 136 maps the range/Doppler/channel image 131 for each detected element 127 into an azimuth/elevation domain. For example, the transfer matrix 136 is a two-dimensional matrix with N rows and M columns. In one example, each column of the transfer matrix 136 is a steering vector.

Given a radar with $N_{dof}$ channels transmitting a waveform s(t), for a scatterer located at range R, a azimuth angle, and e elevation angle, an example steering vector $\underline{s}_r((a, e); R)$ may be defined as:

$$\underline{s}_r((a,e);R)=[s(t-\tau_1((a,e);R))s(t-\tau_2((a,e);R)) \ldots s(t-\tau_{Ndof}((a,e);R))]^T$$

where $s(t-\tau_k((a, e); R))$ is a $k^{th}$ channel path delay return for a scatterer located at azimuth angle, elevation angle, range ((a,e);R) and $[v]^T$ is the transpose of vector v. In one example, $\tau_k$ is a path delay for the $k^{th}$ channel, where k is an integer ranging from k=1 to k=$N_{dof}$.

For example, with a set of L pairs of azimuth and elevation angles $(l_1, l_2, \ldots, l_L)$, an example transfer matrix 136 may be:

$$A(l_1,l_2,\ldots,l_L)=[\underline{s}_{l1}|\underline{s}_{l2}|\ldots|\underline{s}_{lL}]$$

where $\underline{s}_{lk}$ is a steering column vector for the $l_k$ pair of azimuth and elevation angles.

In one example, a lattice construction processor 165 creates a lattice 166 for each detected element 127. For example, the lattice 166 is a set of azimuth/elevation lattice locations $\theta_{nm}$ (e.g., lattice points) for each detected element 127. Given an image angular volume V, $N_a$ azimuth elements, $N_e$ elevation elements, an azimuth resolution da and an elevation resolution de, in one example, the lattice 166 may be constructed such that:

$$\theta_{nm}=(n*da,m*de) \text{ for } n=1,2,\ldots,N_a \text{ and } m=1,2,\ldots,N_e$$

where $N_a*da*N_e*de$=the image angular volume V under consideration.

In one example, a number of lattice points for the lattice 166 may be equal to a number of channels for each detected element 127. In other examples, the number of lattice points may be less than the number of channels. In one example, the number of channels is the number of degrees of freedom (DOF) of the radar.

In one example, an index mapping may be created that maps each lattice point into an integer index for the purpose of efficiently handling vectors with linear algebra. In one example, a set of matrix operators is calculated and stored for each lattice point, to be used in Maximum Likelihood (ML) estimation. In another example, a set of matrix operators is calculated and stored for each lattice point, to be used in a different parameter estimation criterion.

In one example, the lattice 166 initially spans an intrinsic resolution cell and the lattice 166 may be iteratively reduced to produce a reduced lattice 167 (not shown). In another example, the lattice 166 matches the desired resolution and iteration is not utilized. In one example, the iterative reduction of lattice 166 is performed under various constraints. In one example, the lattice construction processor 165 is coupled to a memory unit for creating a lattice of azimuth/elevation lattice locations. In one example, the lattice construction processor 165 reduces the lattice of azimuth/elevation lattice locations to reduced lattice locations under various constraints.

In one example, a maximum likelihood (ML) processor 140 applies maximum likelihood processing to the range/Doppler/channel image 131 and the transfer matrix 136 to produce a set of scatterer parameters 141. In another example, another parameter estimation process (e.g., a Bayesian estimator, a method of moments (MoM) estimator, a least squares estimator, a minimum mean square error (MMSE) estimator, a maximum a posteriori (MAP) estimator, a Wiener filter, etc.) may be used to produce the set of scatterer parameters 141. In one example, the Maximum Likelihood (ML) processor couples to a memory unit. For example, ML processing using an ML estimate may be used to estimate scatterer parameters such as a quantity of scatterers present, scatterer azimuth/elevation lattice locations, and scatterer amplitudes and phases. In one example, a likelihood function with respect to the unknown parameters may be maximized for each hypothesized quantity of scatterers and the hypothesis that yields the smallest error residual may be selected. In one example, a Minimum Description Length (MDL) criterion is added as a penalty to the likelihood function. In one example, a penalty weight increases as image quality degrades. In one example, the Maximum Likelihood (ML) estimate retrieves pre-computed matrix operators for each lattice point from memory storage.

Given L scatterers located at specific azimuth/elevation lattice locations specified by the set of indices $\underline{l}=(l_1, l_2, \ldots, l_L)$, a single (snapshot) multi-channel vector observation $\underline{v}$ may be modeled as:

$$\underline{v} = A(l_1, l_2, \ldots, l_L)\underline{x} + \underline{n}$$

where:
A is an $N_{dof}$ by L transfer matrix.
$\underline{x}$ is a 1 by L vector where each component corresponds to scatterer amplitude and phase.
$\underline{n}$ is a multi-channel noise 1 by $N_{dof}$ vector.

In one example, an ML objective function may be used to determine a best model fit to the vector observation $\underline{v}$. For example, the ML objective function may be a mathematical function (e.g., logarithm of a likelihood function) which has extrema (e.g., maxima and/or minima) which represent an optimal solution. In one example, maximizing the logarithm of the likelihood function with respect to unknown parameters may be used to derive a quantity of scatterers, scatterer azimuth/elevation lattice locations, and scatterer amplitudes and phases. In one example, if additive Gaussian noise is present and if scatterer amplitudes are deterministic, the ML objective function for this example may be written as:

$$-\log\{p(\underline{v}|\underline{x}_L,(l_1,l_2,\ldots,l_L);H_L)\} = (\underline{v}-A(l_1,l_2,\ldots,l_L)\underline{x}_L)^+\Lambda^{-1}(\underline{v}-A(l_1,l_2,\ldots,l_L)\underline{x}_L) + C$$

where:
$(v)^+$ is a transpose conjugate operation of vector or matrix v.
$p(\underline{v}|\underline{\alpha})$ is a likelihood function of $\underline{\alpha}$ given vector observation $\underline{v}$.
$H_L$ is a hypothesis that L scatterers are present.
$\underline{x}_L$ is a complex representation of the amplitudes and phases of the L scatterers present.
$(l_1, l_2, \ldots, l_L)$ denote the corresponding azimuth and elevation angles of the L scatterers.
$\Lambda$ is a covariance of a noise vector $\underline{n}$.
C is a constant.

In one example, in the case of noise with Gaussian statistics, maximizing the likelihood function is equivalent to minimizing the residual error. Hence, the general process of finding the optimal fit is to find the best scatterer azimuth/elevation lattice locations and scatterer amplitude and phase for each hypothesis, and then decide which hypothesis is true.

In one example, a refinement processor 145 accepts the set of scatterer parameters 141 and the transfer matrix 136 as input and refines the set of scatterer parameters 141 to produce a set of refined scatterer parameters 146. In one example, the refinement processor 145 is coupled to a memory unit. In one example, each scatterer azimuth/elevation lattice location within an initial scatterer configuration may be moved to neighboring lattice locations to produce a perturbed scatterer configuration while holding other scatterer lattice locations fixed. In one example, the refinement processor 145 estimates optimal scatterer amplitudes and phases in the perturbed scatterer configuration and selects a perturbed scatterer configuration with a smallest residual error as the refined scatterer configuration. In one example, the perturbed scatterer configuration is done for each hypothesized quantity of scatterers. In one example, processing efficiency is improved by utilizing a gradient of the residual error with respect to scatterer lattice location.

In one example, a sensitivity processor 150 accepts the set of refined scatterer parameters 146 and the transfer matrix 136 as input to determine a minimal-order scatterer configuration 151 that has an acceptable residual error. In one example, the minimal-order scatterer configuration is a scatterer configuration that has acceptable residual error, with a lowest quantity of scatterers compared to other scatterer configurations that have acceptable residual error.

In one example, the sensitivity processor 150 produces a sensitivity value of the residual error with each scatterer absent individually to produce a plurality of sensitivity values for the scatterers in an intermediate scatterer configuration. In one example, the sensitivity processor is coupled to a memory unit. In one example, the sensitivity processor 150 uses the plurality of sensitivity values to select a group of scatterers to retain. In one example, the sensitivity value is obtained by separately removing the presence of each scatterer in a specific lattice location for an intermediate scatterer configuration through its transfer matrix. In another example, the sensitivity value is obtained by separately setting the amplitude of each scatterer in a specific lattice location for an intermediate scatterer configuration to zero.

In one example, the scatterers may be given a ranking according to each sensitivity value for each intermediate scatterer configuration. In one example, a score may be created by summing the rankings for each scatterer to produce a set of summed rankings. In one example, the scatterers may be sorted according to the set of summed rankings, and scatterers may be removed as long as the residual error does not exceed an error threshold. In one example, the minimal-order scatterer configuration 151 is a scatterer configuration with the fewest quantity of scatterers or the lowest degrees of freedom. In one example, the error threshold is fixed. In another example, the error threshold depends on the number of channels. In one example, the residual error is a difference between scatterer observations and an a priori model.

In one example, for a given hypothesis of L scatterers present and given the refined scatterer azimuth/elevation lattice locations, the scatterer amplitudes and phases may be optimally estimated to produce an optimal scatterer amplitude and phase vector $\underline{x}_L^{opt}$ as:

$$\underline{x}_L^{opt} = \{A(l_1,l_2,\ldots,l_L)^+\Lambda^{-1}A(l_1,l_2,\ldots,l_L)\}^{-1}A(l_1,l_2,\ldots,l_L)^+\Lambda^{-1}\underline{v}$$

In one example, the optimal scatterer amplitude and phase vector $\underline{x}_L^{opt}$ may be used to determine the sensitivity for each perturbed scatterer configuration of removed or zeroed scatterer.

In one example, a termination processor 155 accepts the minimal-order scatterer configuration 151 and the transfer matrix 136 as input and determines whether to produce a reduced-spacing lattice configuration 156. In one example, the termination processor 155 is coupled to a memory unit.

In one example, if an input lattice spacing is larger than a desired measurement accuracy, lattice spacing is reduced to provide an updated lattice spacing equal to the reduced lattice spacing. In one example, a reduction flag 157 is set to indicate that lattice spacing should be reduced. In one example, the reduction flag 157 is set by the termination processor 155. For example, if the lattice spacing is not further reduced, the reduction flag 157 is cleared to indicate that lattice spacing should not be reduced to determine an output lattice configuration. In one example, the reduction flag 157 is cleared by the termination processor 155.

In one example, the termination processor 155 determines a determined quantity of scatterers, a determined scatterer azimuth/elevation lattice locations and a determined scatterer amplitudes and phases for the reduced-spacing lattice configuration 156. In one example, the outputs of the termination processor 155 are a set of determined scatterer parameters 158. For example, the set of determined scatterer parameters 158 are the determined quantity of scatterers 158a, the determined scatterer azimuth/elevation lattice locations 158b, and the determined scatterer amplitudes and phases 158c for the reduced-spacing lattice configuration 156. In one example, if the smallest input lattice spacing is larger than the desired measurement accuracy, the lattice spacing is reduced. In one example, the termination processor 155 sends the transfer matrix 136, the reduced-spacing lattice configuration 156, the determined quantity of scatterers 158a, the determined scatterer azimuth/elevation lattice locations 158b, and the determined scatterer amplitudes and phases 158c to the ML processor 140 and a spacing processor 160.

In one example, the spacing processor 160 specifies a reduced lattice spacing 161 to the lattice construction processor 165 based on the reduction flag 157. For example, if the reduction flag 157 is set to indicate that the lattice spacing should be reduced, then the lattice spacing may be reduced by the spacing processor 160. In one example, the lattice spacing is reduced by a factor of two. In one example, an iteration may be performed to reduce the lattice spacing.

In one example, when the lattice spacing is reduced, the ML processor 140 may initialize the Maximum Likelihood (ML) processing on a smaller lattice using an estimate from a larger lattice to produce initial reduced-spacing scatterer parameters. Although FIG. 1 shows separate processors for the range/Doppler/channel processor 130 and the transfer matrix processor 135, in one example, a single processor (e.g., a processor coupled to a memory unit) encompasses the functions of both blocks. Although FIG. 1 shows separate processors for the ML processor 140, the refinement processor 145, the sensitivity processor 150 and the termination processor 155, in one example, a single processor (e.g., a processor coupled to a memory unit) encompasses the functions of two or more blocks.

Figure 2:
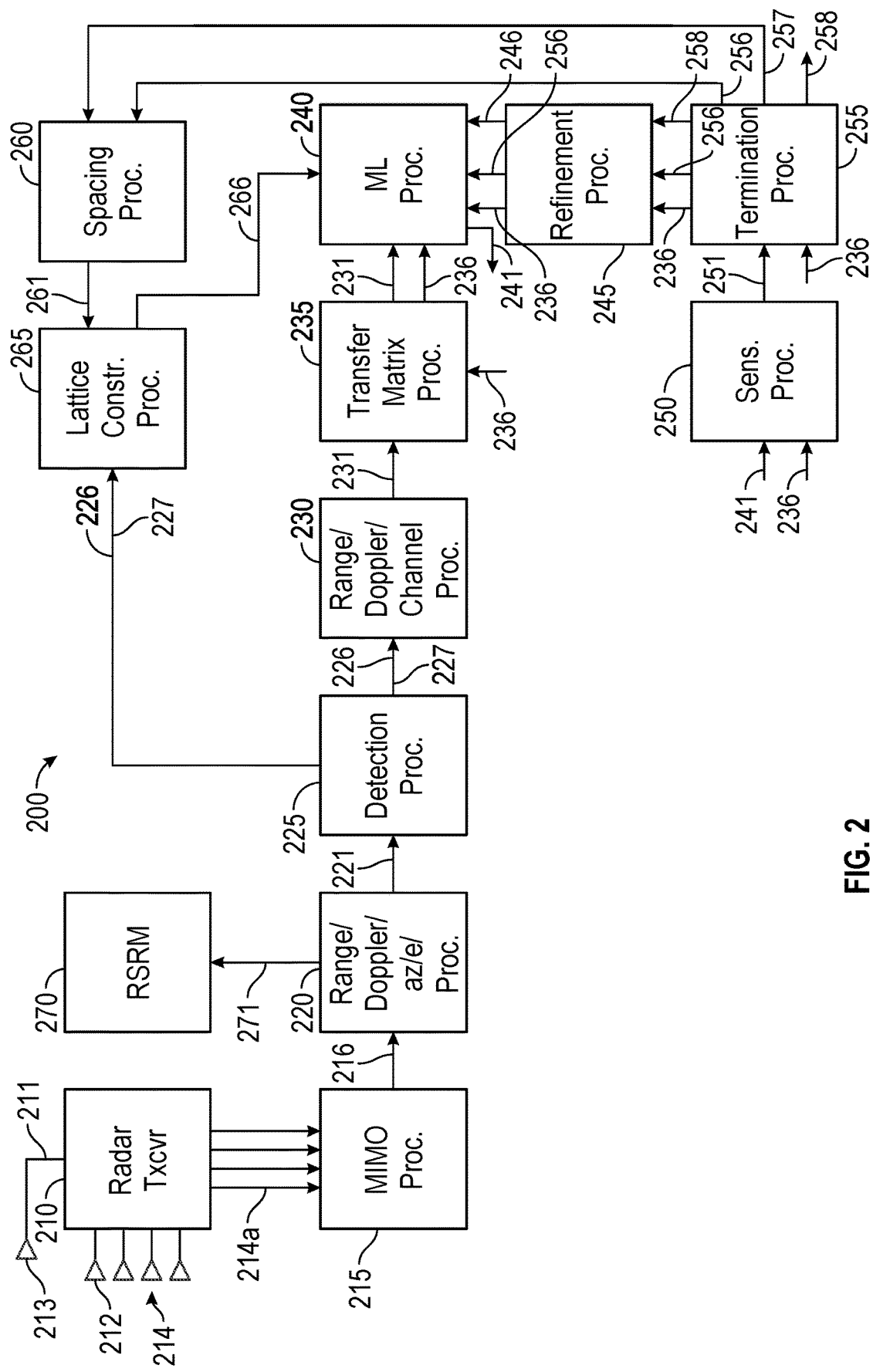
FIG. 2 illustrates a second example block diagram of a radar system in accordance with the present disclosure.

FIG. 2 illustrates a second example block diagram of a radar system 200 in accordance with the present disclosure. In FIG. 2, the flow of data and signal processing through the radar is shown via the arrows. For example, FIG. 2 includes a radar transceiver 210, a MIMO processor 215, a range/Doppler/azimuth/elevation processor 220, a detection processor 225, a range/Doppler/channel processor 230, a transfer matrix processor 235, a maximum likelihood (ML) processor 240, a refinement processor 245, a sensitivity processor 250, a termination processor 255, a spacing processor 260, a lattice construction processor 265 and a radar sensor resource manager (RSRM) 270. Blocks and arrows in FIG. 2 that also appear in FIG. 1 with the same name have the same description in both figures. For example, the ML processor is shown as block 140 in FIG. 1 and block 240 in FIG. 2. Shown in FIG. 2 is an alternative embodiment where the refinement processor 245 is inserted between the termination processor 255 and the ML processor 240. For example, the refinement processor 245 may accept a transfer matrix 236, a reduced-spacing lattice configuration 256 and a set of determined scatterer parameters 258. For example, the set of determined scatterer parameters 258 are a determined quantity of scatterers 258a, a determined scatterer azimuth/elevation lattice locations 258b, and a determined scatterer amplitudes and phases 258c for the reduced-spacing lattice configuration 256. For example, the refinement processor 245 may send a set of refined scatterer parameters 246, the transfer matrix 236, and the reduced-spacing lattice configuration 256 to the ML processor 240.

FIG. 1 and FIG. 2, as well as the associated detailed description, are intended as example configurations and are not intended to represent the only configurations in which the concepts described above may be practiced. It will be apparent to those skilled in the art that these concepts may be practiced without these specific configurations. Although the example block diagrams show specific orderings of the blocks, other orderings of the blocks are possible and are within the scope and spirit of the present disclosure.

Figure 3:
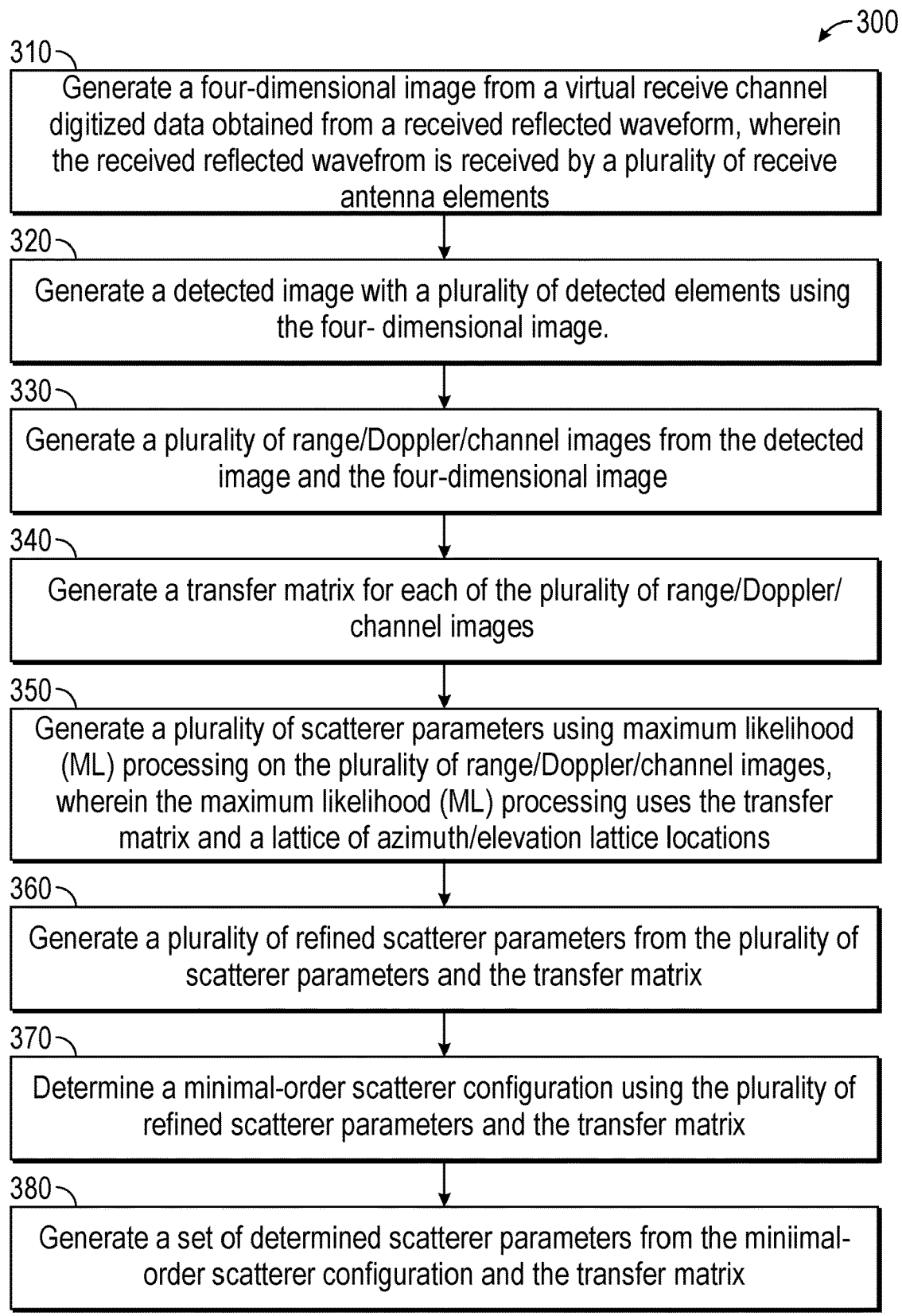
FIG. 3 illustrates an example flow diagram for spatial imaging using an imaging radar in accordance with the present disclosure.

FIG. 3 illustrates an example flow diagram 300 for spatial imaging using an imaging radar in accordance with the present disclosure. In block 310, generate a four-dimensional image from a virtual receive channel digitized data obtained from a received reflected waveform, wherein the received reflected waveform is received by a plurality of receive antenna elements. For example, the received reflected waveform is from a plurality of scatterers. In one example, the virtual receive channel digitized data are obtained from real receive channels. In one example, the virtual receive channel digitized data are obtained from virtual receive channels. In one example, the four-dimensional image may be generated by a range/Doppler/azimuth/elevation processor.

In block 320, generate a detected image with a plurality of detected elements using the four-dimensional image. In one example, the four-dimensional image is a range/Doppler/azimuth/elevation image. In one example, the detected image is produced via thresholding, Constant False Alarm Rate (CFAR) detection, or a machine learned detection algorithm (e.g., a deep convolutional neural network). In one example, the detected image may be generated using a detection processor.

In block 330, generate a plurality of range/Doppler/channel images from the detected image and the four-dimensional image. In one example, the plurality of range/Doppler/channel images is generated by mitigating interference between scatterers that are in a same range/Doppler bin but are separated by more than an intrinsic radar resolution in azimuth or elevation. In one example, the range/Doppler/channel image may be generated using a range/Doppler/channel processor.

In block 340, generate a transfer matrix for each of the plurality of range/Doppler/channel images. In one example, the transfer matrix maps the range/Doppler/channel image into an azimuth/elevation domain. In one example, the transfer matrix map is equivalent to a matrix multiplication. For example, the transfer matrix is a two-dimensional matrix with N rows and M columns. In one example, each column of the transfer matrix is a steering vector. In one example, the transfer matrix may be generated by a transfer matrix processor.

In block 350, generate a plurality of scatterer parameters using maximum likelihood (ML) processing on the plurality of range/Doppler/channel images, wherein the maximum likelihood (ML) processing uses the transfer matrix and a lattice of azimuth/elevation lattice locations. In one example, the scatterer parameters include a quantity of scatterers, a plurality of scatterer azimuth/elevation lattice locations, and a plurality of scatterer amplitudes and phases. In one example, the quantity of scatterers means the quantity of scatterers that are present in the plurality of range/Doppler/channel images.

In one example, the ML processing uses a likelihood function or a logarithm of the likelihood function to determine an optimal solution by minimizing a residual error. In one example, a Minimum Description Length (MDL) criterion is added as a penalty to the likelihood function. In one example, the scatter parameters may be generated by a ML processor.

In block 360, generate a plurality of refined scatterer parameters from the plurality of scatterer parameters and the transfer matrix. In one example, the refined scatterer parameters may be generated by moving each scatterer azimuth/elevation lattice location within an initial scatterer configuration to neighboring lattice locations to generate a perturbed scatterer configuration while holding other scatterer lattice locations fixed. In one example, the refined scatterer parameters may be generated by estimating optimal scatterer amplitudes and phases in the perturbed scatterer configuration and selecting a perturbed scatterer configuration with a smallest residual error as the refined scatterer configuration. In one example, the refined scatterer parameters may be generated by a refinement processor.

In block 370, determine a minimal-order scatterer configuration using the plurality of refined scatterer parameters and the transfer matrix. In one example, the minimal-order scatterer configuration may be determined by generating a plurality of sensitivity values for scatterers in an intermediate scatterer configuration. In one example, the plurality of sensitivity values is used to select a group of scatterers to retain. In one example, the plurality of sensitivity values is generated by separately removing the presence of each scatterer in a specific lattice location for the intermediate scatterer configuration through the transfer matrix. In another example, the plurality of sensitivity values is generated by separately setting the amplitude to zero of each scatterer in a specific lattice location for the intermediate scatterer configuration. In one example, the scatterers may be ranked according to each sensitivity value for each intermediate scatterer configuration. In one example, the minimal-order scatterer configuration has the fewest quantity of scatterers or the lowest degrees of freedom. In one example, the minimal-order scatterer configuration may be determined by a sensitivity processor.

In block 380, generate a set of determined scatterer parameters from the minimal-order scatterer configuration and the transfer matrix. In one example, the generation of the set of determined scatterer parameters includes generating an output lattice configuration. In one example, the set of determined scatterer parameters may include a determined number (i.e., quantity) of scatterers, a determined scatterer azimuth/elevation lattice locations, and a determined scatterer amplitudes and phases for the output lattice configuration. In one example, the output lattice configuration may have reduced lattice spacing. In one example, the output lattice configuration may be used for ML processing with reduced lattice spacing to produce a reduced scatterer parameters. In one example, the set of determined scatterer parameters may be generated by a termination processor.

In one aspect, one or more of the steps for providing spatial imaging in FIG. 3 may be executed by one or more processors which may include hardware, software, firmware, etc. In one aspect, one or more of the steps in FIG. 3 may be executed by one or more processors which may include hardware, software, firmware, etc. The one or more processors, for example, may be used to execute software or firmware needed to perform the steps in the flow diagram of FIG. 3. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for dual processing. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for spatial imaging using an imaging radar, the method comprising:
   generating a plurality of range/Doppler/channel images from a detected image and a four-dimensional image;
   generating a transfer matrix for each of the plurality of range/Doppler/channel images;
   generating a plurality of scatterer parameters using maximum likelihood (ML) processing on the plurality of range/Doppler/channel images;
   generating a plurality of refined scatterer parameters from the plurality of scatterer parameters and the transfer matrix;
   determining a minimal-order scatterer configuration using the plurality of refined scatterer parameters and the transfer matrix; and
   generating a set of determined scatterer parameters from the minimal-order scatterer configuration and the transfer matrix.

2. The method of claim 1, wherein the maximum likelihood (ML) processing uses the transfer matrix and a lattice of azimuth/elevation lattice locations.

3. The method of claim 2, further comprising generating the four-dimensional image from a virtual receive channel digitized data obtained from a received reflected waveform.

4. The method of claim 3, further comprising receiving the received reflected waveform from a plurality of receive antenna elements.

5. The method of claim 3, further comprising generating the detected image with a plurality of detected elements detected using the four-dimensional image.

6. The method of claim 5, wherein the virtual receive channel digitized data are obtained from a plurality of real receive channels.

7. The method of claim 5, wherein the virtual receive channel digitized data are obtained from a plurality of virtual receive channels.

8. The method of claim 5, wherein the detected image is generated using thresholding, Constant False Alarm Rate (CFAR) detection or a machine learned detection algorithm.

9. The method of claim 5, further comprising generating the plurality of range/Doppler/channel images by mitigating interference between scatterers that are in a same range/Doppler bin but are separated by more than an intrinsic radar resolution in azimuth or elevation.

10. The method of claim 9, wherein the transfer matrix maps the range/Doppler/channel image into an azimuth/elevation domain.

11. The method of claim 10, wherein the scatterer parameters include a quantity of scatterers, a plurality of scatterer azimuth/elevation lattice locations, or a plurality of scatterer amplitudes and phases.

12. The method of claim 11, further comprising generating the refined scatterer parameters by moving each of the plurality of scatterer azimuth/elevation lattice locations within an initial scatterer configuration to a plurality of neighboring lattice locations to generate a perturbed scatterer configuration.

13. The method of claim 12, wherein the perturbed scatterer configuration is generated while holding other scatterer lattice locations fixed.

14. The method of claim 1, wherein the generation of the set of determined scatterer parameters includes generating an output lattice configuration.

15. The method of claim 14, wherein the set of determined scatterer parameters may include a determined quantity of scatterers, a plurality of determined scatterer azimuth/elevation lattice locations, or a plurality of determined scatterer amplitudes and phases for the output lattice configuration.

16. The method of claim 1, wherein the minimal-order scatterer configuration may be determined by generating a plurality of sensitivity values for scatterers in an intermediate scatterer configuration.

17. The method of claim 16, wherein the plurality of sensitivity values is generated by separately removing the presence of each scatterer in a specific lattice location for the intermediate scatterer configuration through the transfer matrix.

18. The method of claim 16, wherein the plurality of sensitivity values is generated by separately setting the amplitude to zero of each scatterer in a specific lattice location for the intermediate scatterer configuration.

* * * * *